Dec. 13, 1966     A. L. CLAY     3,291,507
SUPPORT DEVICE
Filed March 10, 1964
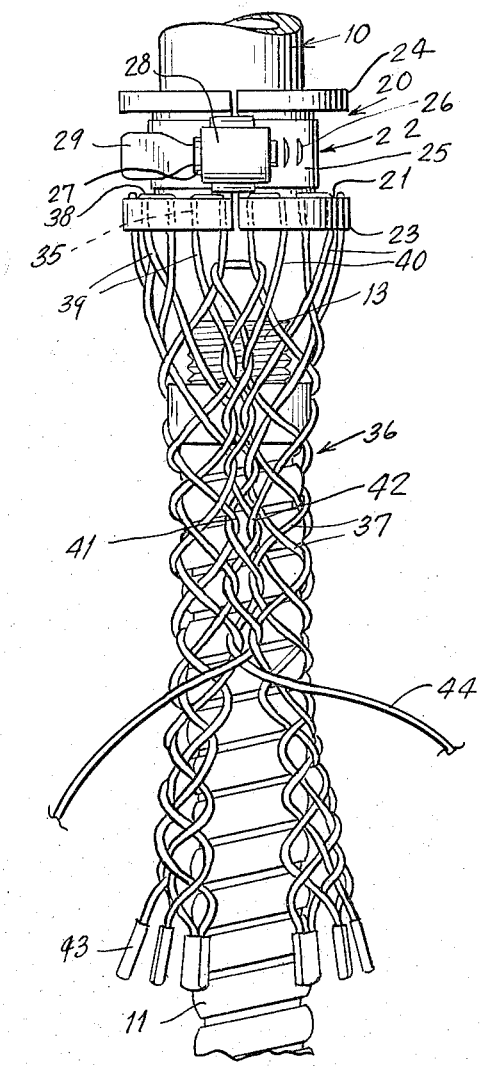
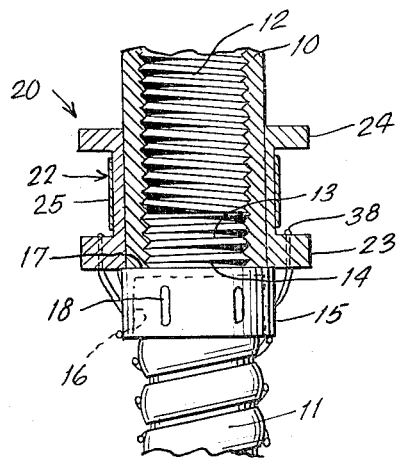
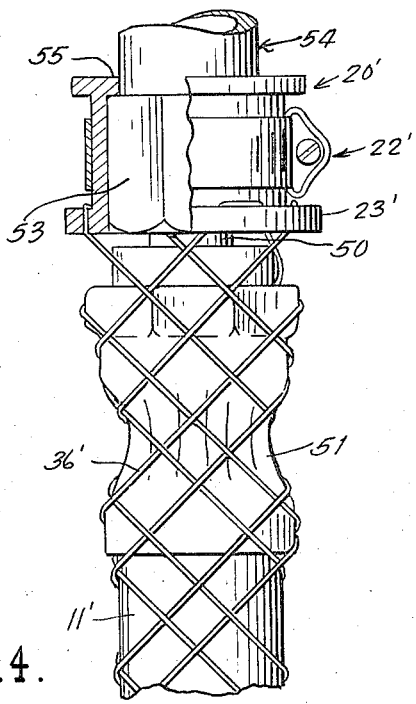
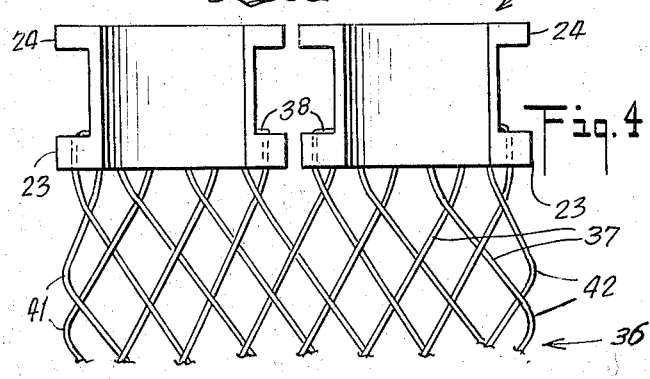
INVENTOR.
ALBERT L. CLAY
BY
ATTORNEYS

United States Patent Office 3,291,507
Patented Dec. 13, 1966

3,291,507
SUPPORT DEVICE
Albert L. Clay, Mystic, Conn., assignor to The Kellems Company, Incorporated, Stonington, Conn., a corporation of Connecticut
Filed Mar. 10, 1964, Ser. No. 350,710
7 Claims. (Cl. 285—114)

This invention relates to support devices and more particularly to a detachable device for holding a flexible member in supported relation on a rigid member. It is often necessary to connect a flexible member such as a rope, cable or tubing to a rigid member so that such connection will be maintained even though the connection is subjected to considerable vibration and variations in stress during the usage of the connected members. Thus, the problem has been presented as to how to maintain a corrugated metal tubing in coupled supported relation on a piece of piping so that the coupled relation of such parts will not be broken even though the corrugated tubing is subjected to variable stresses of such intensity that ordinary methods of coupling will not be able to maintain such relation. Problems of this type also arise in connection with supporting a length of cable within a conduit riser without damage to the sheathing of the cable, or in connection with the secure attachment of ropes and wires to rigid tubular members.

The primary purpose of the present invention is to provide an improved support device which will securely hold a flexible member in supported relation on a rigid member during the usage of such members and yet which may be readily connected to and detached from such members, or modified in its attachment thereto.

Other objects of the invention, as well as the novel features of construction thereof, will appear from the following description when read in connection with the accompanying drawings in which FIG. 1 is an elevational view of a support device constructed in accordance with the invention and showing by way of example the device securing together in coupled relation a section of rigid piping and a metal corrugated tubing, the parts being shown together in partly disassembled relation in order that their construction may more clearly be seen;

FIG. 2 is a sectional view showing the parts in assembled relation;

FIG. 3 is a partial elevational view of a modified form of the invention; and

FIG. 4 is a partial detailed view showing the manner in which the ring sections of the devices illustrated are woven into the open meshed structures thereof.

In the embodiment shown in FIGS. 1 and 2 for the purpose of illustrating the invention, the reference character 10 indicates generally a piece of rigid piping to which is to be coupled a section 11 of corrugated spiral metal tubing. The connected end of the pipe 10 is provided with an internal thread 12 adapted to threadedly receive a male thread 13 provided on a reduced end section 14 of a coupling member 15. The reduced coupling section 14 has an internal diameter approximating that of the corrugated tubing 11 and a length approximating the length of the body of the coupling member 15. The thread 13 extends substantially throughout the length of the reduced section 14. The body of the coupling member 15 is provided with an internal thread 16 adapted to be screwed onto the outer spirally shaped convolutions on the exterior of the tubing 11. The coupling member body forms with the reduced section 14 thereof an annular transverse shoulder 17 against which the terminal end of the tubing 11 abuts when such body is fully attached to such tubing. The outside diameter of the coupling member body is materially greater than the outside diameter of the tubing 11 so that when such body is in position on the latter it provides an annular holding shoulder, the purposes of which will hereinafter become more clear. Projections 18 are provided on the exterior of the coupling member body to enable a suitable tool to be utilized to attach and detach such member from the tubing 11.

Mounted on the terminal end portion of the pipe 10 and enclosing the internal thread 12 provided therein is a ring 20 composed of a plurality of separate parts, the combined circumferential dimensions of which are materially less than that of the ring 20 so that there are substantial spaces between the opposed ends of such ring parts. The ring 20 is of material axial length, of the order of at least one inch, and has an outside diameter at least one half inch greater than the outside diameter of the pipe 10 so that it provides a sufficiently wide shoulder to enable it to be readily seated on a support such as the upper end of a riser conduit. The ring 20 is also provided intermediate its ends with an annular groove 21 which is of a width greater than one half the axial dimension of the ring, and is of substantial depth, at least one half the thickness of the ring, to enable a clamping device 22 to be substantially contained therein between the two annular shoulders 23 and 24 formed by such groove 21. The clamping device 22 may be any suitable known kind capable of securing the ring parts in assembled condition fixedly to the pipe 10. In the embodiment illustrated, the clamping device is of a type known to the trade and composed of a flexible metal strip 25 that may be wrapped around the ring and which is provided with a series of openings 26 shaped to be engaged by the convolutions of a worm 27 rotatably mounted in a casing attached to one end of the strip 25 and actuated by a finger piece 29. It will be understood that the outer free end of the strip 25 is inserted through the casing 28 beneath the worm 27 so that the convolutions of the latter engage with the openings 26 on the strip. By turning the finger piece 29 the strip 25 may be securely tightened in the groove 21 of the ring 20. The spaces between the ends of the ring sections enable the clamping device to be so securely tightened that the ring will be in effect fixed to the pipe 10. Such spaces also enable the ring to be secured in a tight fit to pipes with outside diameters in a range of variable sizes and to other members having a variety of outside diameters.

The groove 21 is located on the ring 20 so that the annular shoulder 23 on ring 20 is materially thicker and therefore stronger than the shoulder 24 thereof. Shoulder 23 is provided adjacent to the inner wall of the groove 21, with a plurality of circularly arranged spaced apertures 35 to enable the attachment to such shoulder of an open meshed tubular structure designated generally by the reference numeral 36. The open meshed structure 36 is composed of a plurality of wire strands 37 which may be equal in number to one-half the number of apertures in the two sections of the ring 20. In the embodiment disclosed, the shoulder portion 23 of each ring section is provided with an even number of apertures 35 and each wire strand has an intermediate portion 38 seated in anchored relation on the inside surface of such shoulder portion within the groove 21 and between two adjacent of such apertures therethrough. In the embodiment of FIG. 1, each ring section is provided with eight apertures through which are threaded four wire strands. The equal length sides or sections 39, 40 of each strand extend downwardly through such two adjacent apertures and below the ring 20 are interwoven or braided in open meshed relation with the sides or sections of the other wire strands 37. It will be noted that the strand sections are woven to provide the open meshed structure 36 with longitudinally extending edges 41, 42 aligned with one pair of adjacent opposed ends of the two ring sections, while the opposite side of the open meshed structure is uninterrupted. This is accomplished by having the strand sections 39 spiral downwardly from the ring 20 about the central longitudinal axis of the structure in one direction until it reaches the edge 41, where its spiralling direction is reversed to form a loop at such edge and then it spirals downwardly in the opposite direction toward either the lower end of the structure 36 or the other edge 42 where its spiralling direction is again reversed so that it is then woven in its original direction. In a similar manner the strand sections 40 spiral downwardly of the open meshed structure but start downwardly from the ring 20 in a direction opposite to that of the strand sections 39 so that they initially extend toward the edge 42 before being reversed in their spiralling direction. At the lower end of the structure 36, the lower ends of the strand sections 39 and 40 are bound together in pairs by a plurality of coupling members or clips 43. It will be noted that at the diametrically opposite other pair of adjacent opposed ends of the two ring sections, the strand sections 39 coming down from one of such ring sections spiral downwardly in intersecting relation with the strand sections 40 coming down from the other of such ring sections, thus weaving the ring sections into the open meshed structure so that they become an integral inseparable part thereof. This construction thus enables the whole device including the ring to be readily opened and wrapped around the several coupled parts in securing the device to such parts. When the whole device is mounted on the coupled parts, the open meshed structure 36 is closed by lacing a wire 44 through the loops forming the longitudinal edges 41, 42 thereof. This lacing operation may be accomplished by extending an intermediate portion of the lacing wire 44 through the top loops in the structure next to the coupling member 15 and lacing the two resulting sections thereof alternately through loops in the two edges 41, 42 in the manner of lacing a shoe.

It will be understood that in the use of the device shown in FIGS. 1 to 3 of the drawings, the coupling member 15 is screwed onto an end of the corrugated tubing 11 and then the reduced end section 14 thereof is screwed into the threaded end of the pipe 10. With the corrugated tubing 11 thus properly coupled to the pipe 10, the support device is wrapped therearound so that the ring 20 encircles the threaded end of the pipe 10 and the open meshed structure 36 thereof encloses the body of the coupling member 15 and the adjacent portion of the corrugated tubing 11. The two sections of the ring 20 are loosely clamped to the pipe 10 by the clamping device 22 and then the ring is slid down until it engages the shoulder 17 on the coupling member 15 which functions as a positioning stop for the ring 20. The clamp 22 is then tightened to securely fix the ring in position on the pipe 10. Finally the open meshed structure 36 is tightly secured around the coupling body and the corrugated tubing 11 by lacing the two edges 41, 42 together with the lacing wire 44 so that the loops in the two edges 41, 42 are brought together as close as possible. When the last loops have been laced the two sections of lacing wire are twisted together with pliers, then wrapped around the end of the grip just above the end tabs 43 and twisted together a second time. With the parts thus secured together, the body of the coupling member 15 which is in the nature of a shoulder provided on the corrugated tube will function as an anchoring member for the open meshed structure 36 and will itself be prevented from separating either from the pipe 10 or the corrugated tubing 11 by reason of the grip of such structure on such body and the tubing. When any pull or force is exerted on the coupled unit tending to separate the parts thereof either longitudinally or torsionally, such force either by itself or through its action on the coupled parts, will tend to elongate the open meshed structure thus reducing its cross-sectional area and consequently causing the strands thereof to engage or tighten further upon the exterior surfaces of the coupling body and the tubing 11 and thereby more firmly bind the parts together. To enable the parts to be uncoupled, it is only necessary to remove the lacing wire 44 from the open meshed structure, either by unlacing or destroying it, and releasing the clamp 22; whereupon the support device may be readily removed from the coupled parts.

In the construction disclosed in FIG. 3 of the drawings, the tubing 11' may be the end of a reenforced hosing constituted of an inner metallic braided tubing enclosed by a rubber sheathing. Inserted in the end of the tubing 11' is a metal tube 50 which is permanently secured to the tubing by a press fitted tubular member 51 having an upper enlarged or shoulder portion 52. The metal tube 50 is externally threaded and is coupled by means of such thread to an internally threaded nut-shaped coupling member 53 provided in any suitable manner on a support member or tubing member indicated generally by the numeral 54. Mounted on the coupling member 53 is a split ring 20' substantially similar in construction to the previously described split ring 20 except that it additionally includes at its upper end an inturned flange 55 formed on the ring sections and engaging the shoulder afforded by the upper end of the coupling member 53. The two ring sections are secured in position on the coupling member 53 by a clamping device 22' which may be similar in construction to the previously described clamping device 22. The lower shoulder 23' is woven into the upper end of an open meshed structure 36' which it supports. The open meshed structure 36' may be constructed in the manner of the previously described open meshed structure 36, or as shown in FIG. 4, it may be woven in tubular form throughout its length in a manner known to the art to provide a closed structure instead of being split lengthwise as is the structure 36.

In assembling the structure of FIG. 4, the end of the hose 11' is inserted up through the open meshed structure 36' which may be longitudinally compressed to facilitate such insertion, until the threaded end of the pipe tube 50 is located within the split ring 20'. The pipe tube 50 is then screwed into the coupling member 53 to connect the end of the hose 11' thereto. When the hose 11' is coupled to the member 53, the ring is positioned on the latter with its inturned flange 55 seated on the shoulder formed between such member 53 and the supporting member 54. The clamping device 22' is then secured in position to unite the ring 20' to the member 53. When this has been accomplished the open meshed structure 36' may be stretched downwardly to bring the wire strands thereof into tight engagement with the shoulder 52 and the body of the tubular member 51 and the exterior of the hose below such tubular member 51. The shoulder 52, reduced portion and lower end of the tubular member 51 will, as was the case with the body of the coupling element 15 above described, cooperate with the open meshed structure 36' to maintain the coupled parts in coupled relation. Any forces tending to loosen or break such coupled relation of the parts will only result in the strands of the open meshed structure retracting radially to secure a firmer grip on the tubular member 51 and the hose 11'.

While I have hereinabove described and illustrated several preferred forms of my invention, it will be apparent to those skilled in the art that changes and modifications may be made therein without departing from the spirit of the invention or the scope of the appended claims.

I claim:

1. In a coupling, a pair of separate coupling means adapted to be interengaged in coupled relation to connect together a pair of separate members, a ring split into a plurality of sections adapted to be placed in encircling relation on an attaching surface associated with one of said separate members and having a combined circumferential dimension less than the outside circumferential dimension of said attaching surface, and said ring having an annular clamp supporting section provided on its exterior surface, a clamping device mounted on said clamp supporting section and encircling said ring sections and adapted to clamp said ring sections to said attaching surface, gripping means connected at one end to and extending outwardly from one end of said split ring and enclosing the other of said separate members, and means provided on the sections of said split ring for connecting said connected end of said gripping means to said split ring, said gripping means being composed of a plurality of wire strands extending from and connected in circular relation to the sections of said split ring by said connecting means and being interwoven to form an open mesh structure adapted to be positioned in surrounding gripping relation over said other separate member.

2. In a coupling as defined in claim 1, in which one of said pair of coupling means comprises a first coupling member having an internal thread connected to said one separate member, in which the other of said pair of coupling means comprises a second coupling member having an external thread engageable with the internal thread of said first coupling member, and a tubular member for connecting said second coupling member to said other separate member and cooperable with said open mesh structure to enhance the gripping action of the latter in the coupled condition of the pair of coupled members.

3. In a coupling such as defined in claim 1, in which said coupling means connected to said one separate member comprises a coupling member encircled by said split ring and providing thereon a retaining shoulder, and in which said split ring is provided on its inner end with an inwardly extending annular flange engageable with said retaining shoulder.

4. In a coupling such as defined in claim 1, in which the one of said pair of coupling means connected to said other separate member includes outwardly projecting means adapted to cooperate with said open mesh structure to enhance the gripping action of the latter.

5. In a coupling such as defined in claim 4, in which said one coupling means comprises a coupling member interengageable with the other of said coupling means connected to said one separate member, and in which said outwardly projecting means is formed on said coupling member.

6. In a coupling such as defined in claim 4, in which said outwardly projecting means is located on said one coupling means to form positioning means for said split ring on said one separate member.

7. In a coupling such as defined in claim 4, in which said one coupling means comprises a tubular member mounted on said other separate member, and in which said outwardly projecting means is formed on said tubular member.

References Cited by the Examiner
UNITED STATES PATENTS

| | | | |
|---|---|---|---|
| 806,135 | 12/1905 | Greenfield | 285—420 |
| 832,401 | 10/1906 | Martin | 24—123.5 |
| 899,623 | 9/1908 | Royer | 285—408 X |
| 1,294,921 | 2/1919 | Lewis | 285—241 |
| 1,473,362 | 11/1923 | Tilton | 285—305 |
| 1,982,732 | 12/1934 | Fletcher | 285—305 X |
| 2,143,985 | 1/1939 | Kellems | 24—123.5 |
| 2,198,996 | 4/1940 | Guarnaschelli | 285—305 |
| 2,602,207 | 7/1952 | Kellems | 24—123.5 |
| 2,740,178 | 4/1956 | Kellems | 224—123.5 |
| 2,750,210 | 6/1956 | Trogdon | 285—305 X |
| 2,777,714 | 1/1957 | Lamphere | 285—410 X |
| 2,813,730 | 11/1957 | Courtot | 285—305 X |
| 2,963,305 | 12/1960 | Miller | 285—114 |

FOREIGN PATENTS 228,439  11/1959  Australia.

THOMAS F. CALLAGHAN, *Primary Examiner.*

R. A. GIANGIORGI, *Assistant Examiner.*